(12) United States Patent
Chen (10) Patent No.: US 9,919,253 B2
(45) Date of Patent: Mar. 20, 2018

(54) FILTER ASSEMBLY FOR A FLUID FILTER

(71) Applicant: Po-Hui Chen, Changhua County (TW)

(72) Inventor: Po-Hui Chen, Changhua County (TW)

( * ) Notice: Subject to any disclaimer, the term of this patent is extended or adjusted under 35 U.S.C. 154(b) by 530 days.

(21) Appl. No.: 14/616,740

(22) Filed: Feb. 8, 2015

(65) Prior Publication Data
US 2016/0228799 A1   Aug. 11, 2016

(51) Int. Cl.
*B01D 46/00* (2006.01)

(52) U.S. Cl.
CPC ....... *B01D 46/003* (2013.01); *B01D 46/0021* (2013.01)

(58) Field of Classification Search
CPC .............. B01D 46/003; B01D 46/0023; B01D 46/0024; B01D 29/0052
See application file for complete search history.

(56) References Cited

U.S. PATENT DOCUMENTS

2008/0099085 A1*   5/2008   Marvin .............. B01D 46/0023
                                                                  137/550

* cited by examiner

*Primary Examiner* — Patrick Orme
(74) *Attorney, Agent, or Firm* — Bruce Stone LLP; Joseph A. Bruce (57) ABSTRACT

A filter assembly for a fluid filter includes a plurality of filter units assembled in series, and each filter unit includes: a connecting member, an input member and an output member. The input member of each of the filter units has an extending pipe connected to a connecting pipe of another filter unit, so that the filter units can be easily assembled by directly screwing the connecting pipe of the connecting member of one filter unit into the extending pipe of the input member of another filter unit, without using tools or fasteners. Hence, the assembling cost is relatively reduced.

10 Claims, 7 Drawing Sheets

FIG.7

FILTER ASSEMBLY FOR A FLUID FILTER

BACKGROUND OF THE INVENTION

Field of the Invention

The present invention relates to a filter, and more particularly to filter assembly for a fluid filter.

Description of the Prior Art

Fluid filters are used to remove micro particles, oil or moisture from the gas, or remove impurities from liquid.

Among the fluid filters, an air compressor moisture removal device is provided with a separating layer assembly which includes a plurality of layers removably superimposed one on top of another. Each of the layers is provided with a concave at one end, a protruding portion at another end, and a hole penetrating through the two ends, so that the layers are superimposed in such a manner that the protrusion of one layer is engaged in the concave of another layer, and the number of the layers can be adjusted as desired.

However, the layers have to be assembled together by a screw inserted through the holes of the layers and then fixed to a gas guide member. The assembling of the layers requires the use of the screw, and the length of the screw has to change according to the number of the layers, which makes the assembly troublesome.

The present invention has arisen to mitigate and/or obviate the afore-described disadvantages.

SUMMARY OF THE INVENTION

The primary objective of the present invention is to provide a filter assembly for a fluid filter which is capable of reducing assembling cost.

Another objective of the present invention is to provide a filter assembly for a fluid filter which is capable of reducing manufacturing cost.

To achieve the above objectives, a filter assembly for a fluid filter in accordance with the present invention comprises: a plurality of filter units assembled in series, and each of the filter units comprises: a connecting member; an input member disposed on a bottom surface of the connecting member and including a plurality of input pipes which are each provided with an input passage, and a separating portion which is disposed in each of the input pipes to divide the input passage into an upper input chamber and a lower input chamber, each of the separating portions including an input hole in communication with the upper and lower input chambers; and an output member fixed on a top surface of the input member and including a plurality of output protrusions to seal the upper input chambers, each of the output protrusions including an output hole in communication with the upper input chamber, each of the output holes and a corresponding one of the input holes being staggered at 180 degrees to each other.

To achieve the above objectives, another filter assembly for a fluid filter in accordance with the present invention comprises: a plurality of filter units assembled in series, and each of the filter units comprises: a connecting member including a connecting disc, a connecting pipe which protrudes from a top surface of the connecting disc and is provided with a guiding passage penetrating through the connecting disc, and an connecting ring which protrudes from a bottom surface of the connecting disc; an input member including an input plate, an input ring which protrudes from a top surface of the input plate and fixed to the connecting ring, an extending pipe which penetrates through the input plate and is provided for insertion of a connecting pipe of another filter unit, a plurality of input pipes which protrude from a bottom surface of the input plate and are each provided with an input passage penetrating through the input plate, and a separating portion which is disposed in each of the input pipes to divide the input passage into an upper input chamber and a lower input chamber, each of the separating portions including an input hole in communication with the upper and lower input chambers; and an output member being fixed on the top surface of the input plate, and including an inserting hole for insertion of the extending pipe, and a plurality of output protrusions to seal the upper input chambers, and each of the output protrusions including an output hole in communication with a corresponding one of the upper input chambers.

Preferably, the input ring is fixed on an inner surface of the connecting ring.

Preferably, the extending pipe includes an extending section which protrudes from the top surface of the input plate and is inserted in the inserting hole of the output member.

Preferably, the output member further comprises an output ring which is fixed on an inner surface of the input ring of the input member, and an airtightness is maintained between an end surface of the output ring and the bottom surface of the connecting disc.

Preferably, each of the output holes of the output member and a corresponding one of the input holes of the input member are staggered at 180 degrees to each other.

Preferably, the connecting pipe of the connecting member of a first one of the filter units is disposed in an output pipe of a filter cover.

Preferably, the extending pipe of the input member of a last one of the filter units is sealed with a plug.

Preferably, the plug includes a plug portion which is inserted in the extending pipe to produce a sealing effect, a cover portion which covers the input pipes of the input member, and a recess formed in the cover portion.

Preferably, an inner pipe is sleeved onto the connecting ring of the connecting member of a first one of the filter units.

Preferably, a connecting disc of a connecting member of the first one of the filter units has a diameter larger than an outer diameter of the inner pipe.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
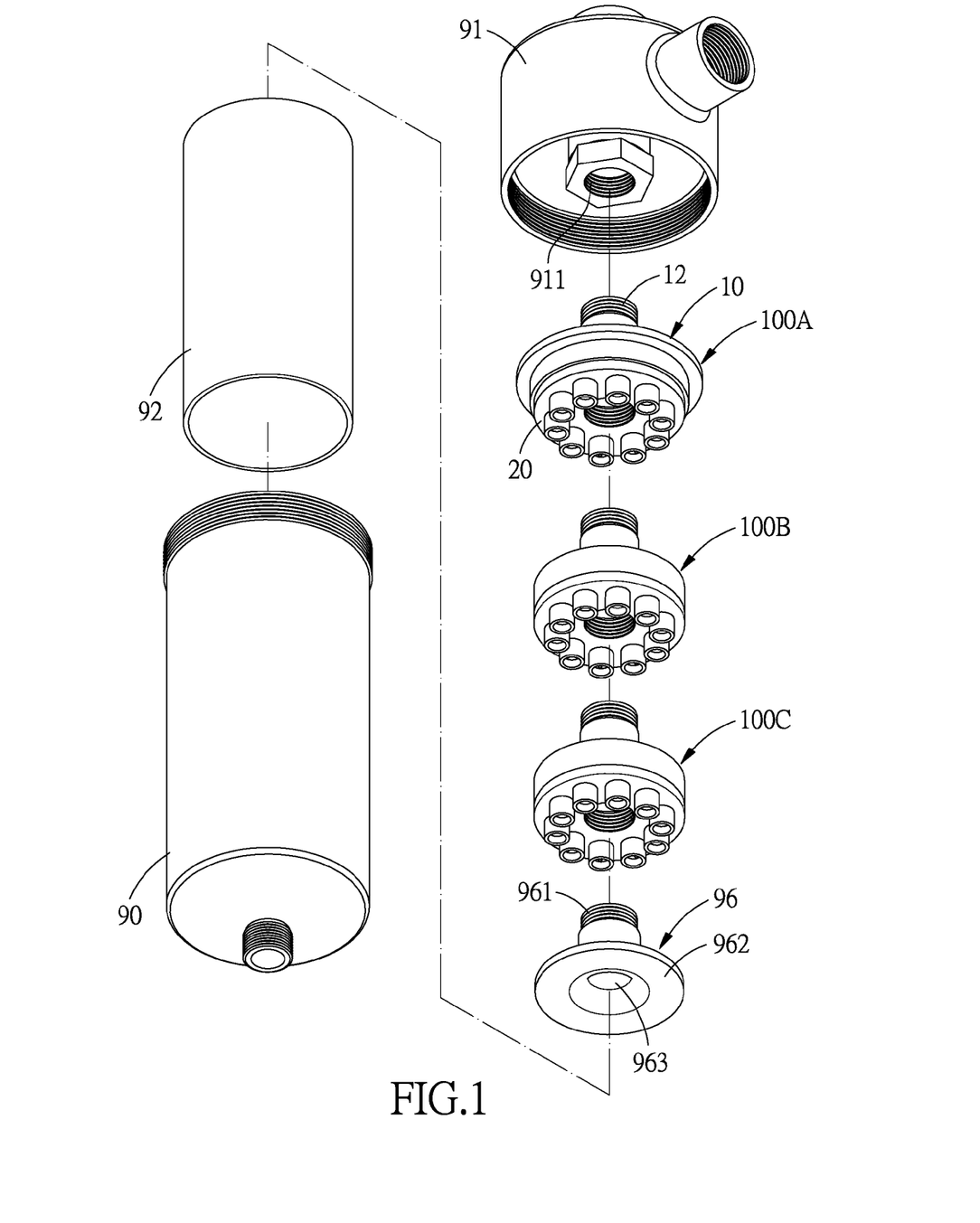
FIG. 1 is an exploded view of a filter assembly for a fluid filter in accordance with the present invention.
Figure 2:
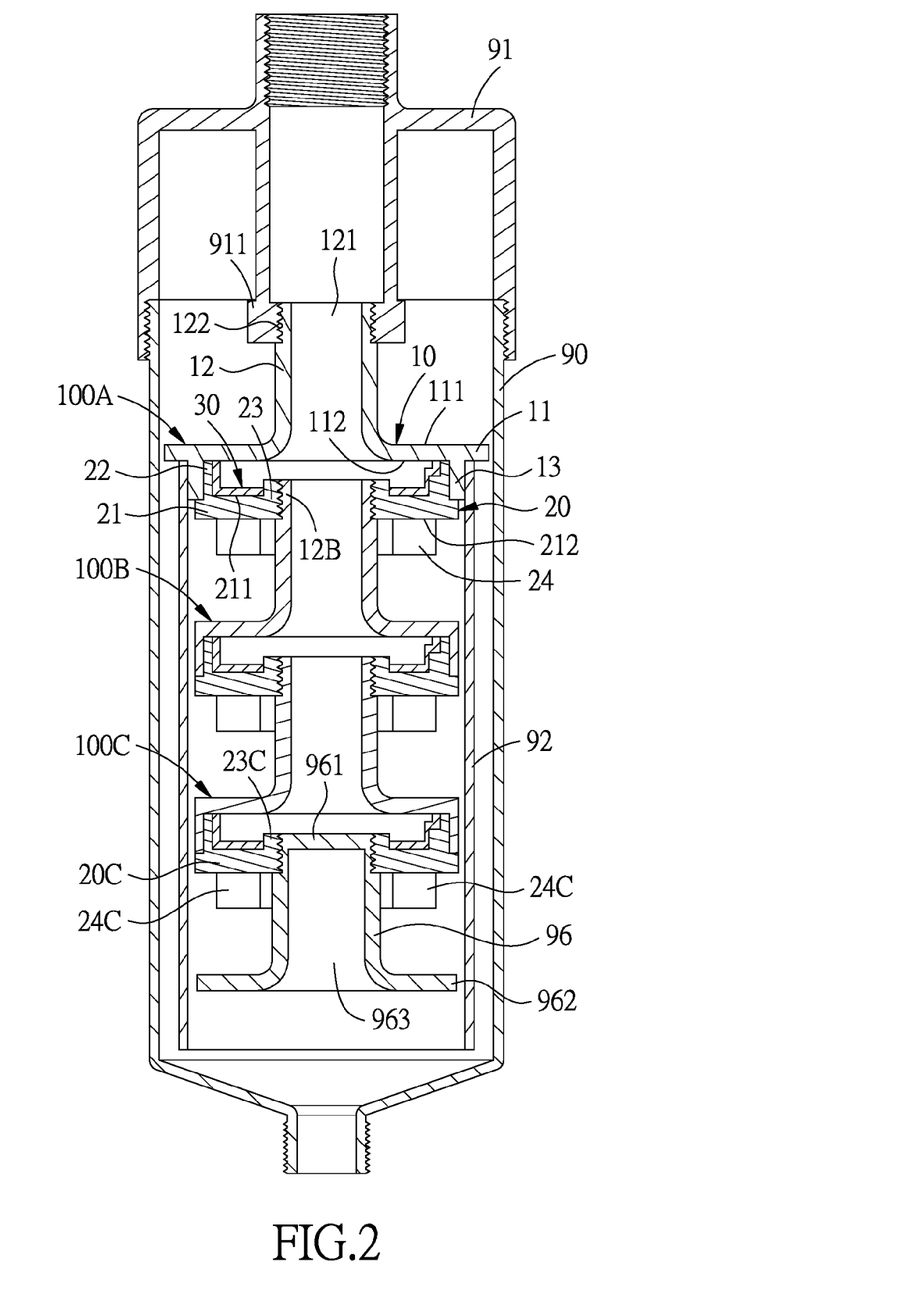
FIG. 2 is a cross sectional view of the filter assembly for a fluid filter in accordance with the present invention.
Figure 3:
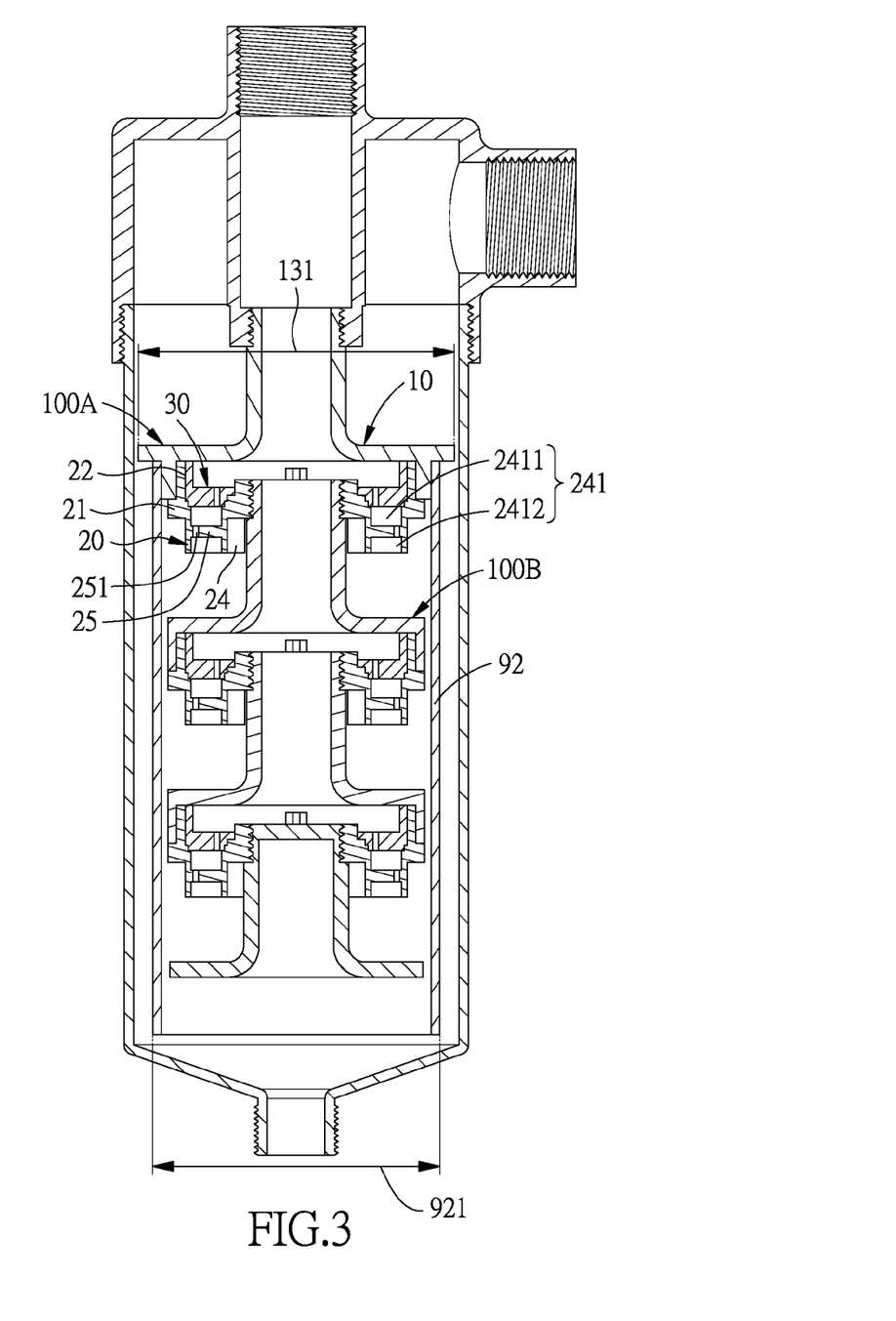
FIG. 3 is another cross sectional view of the filter assembly for a fluid filter in accordance with the present invention.
Figure 4:
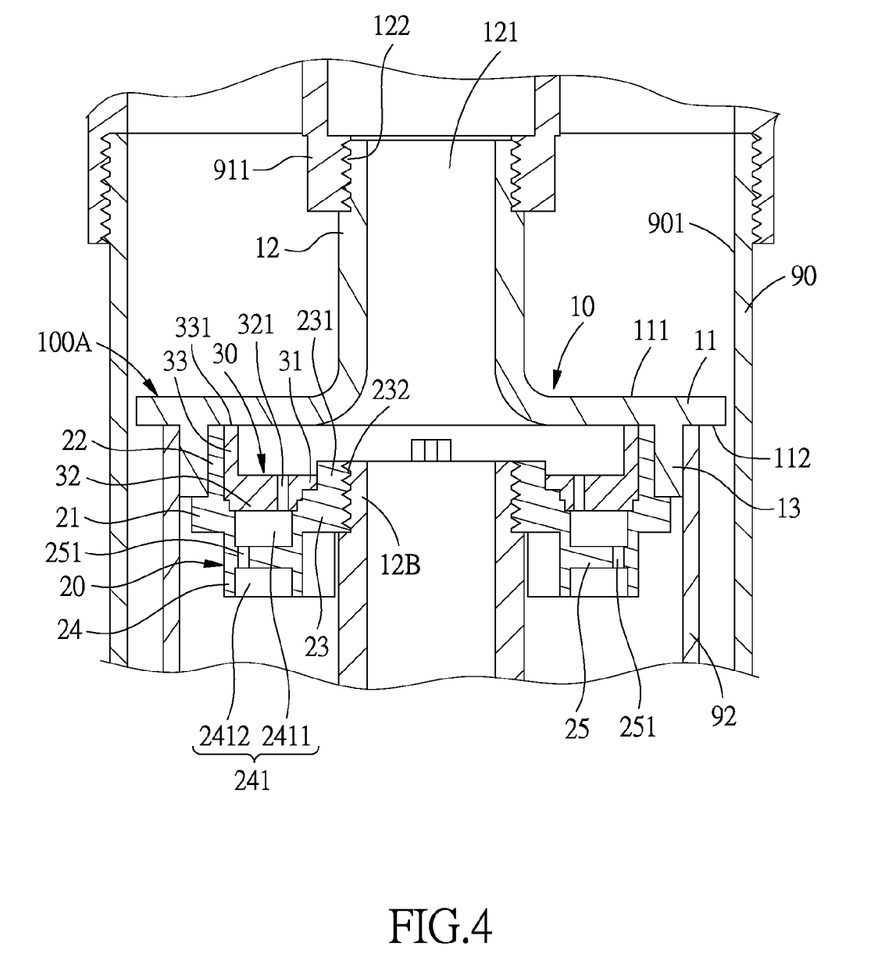
FIG. 4 is an enlarged view of a part of FIG. 3.
Figure 5:
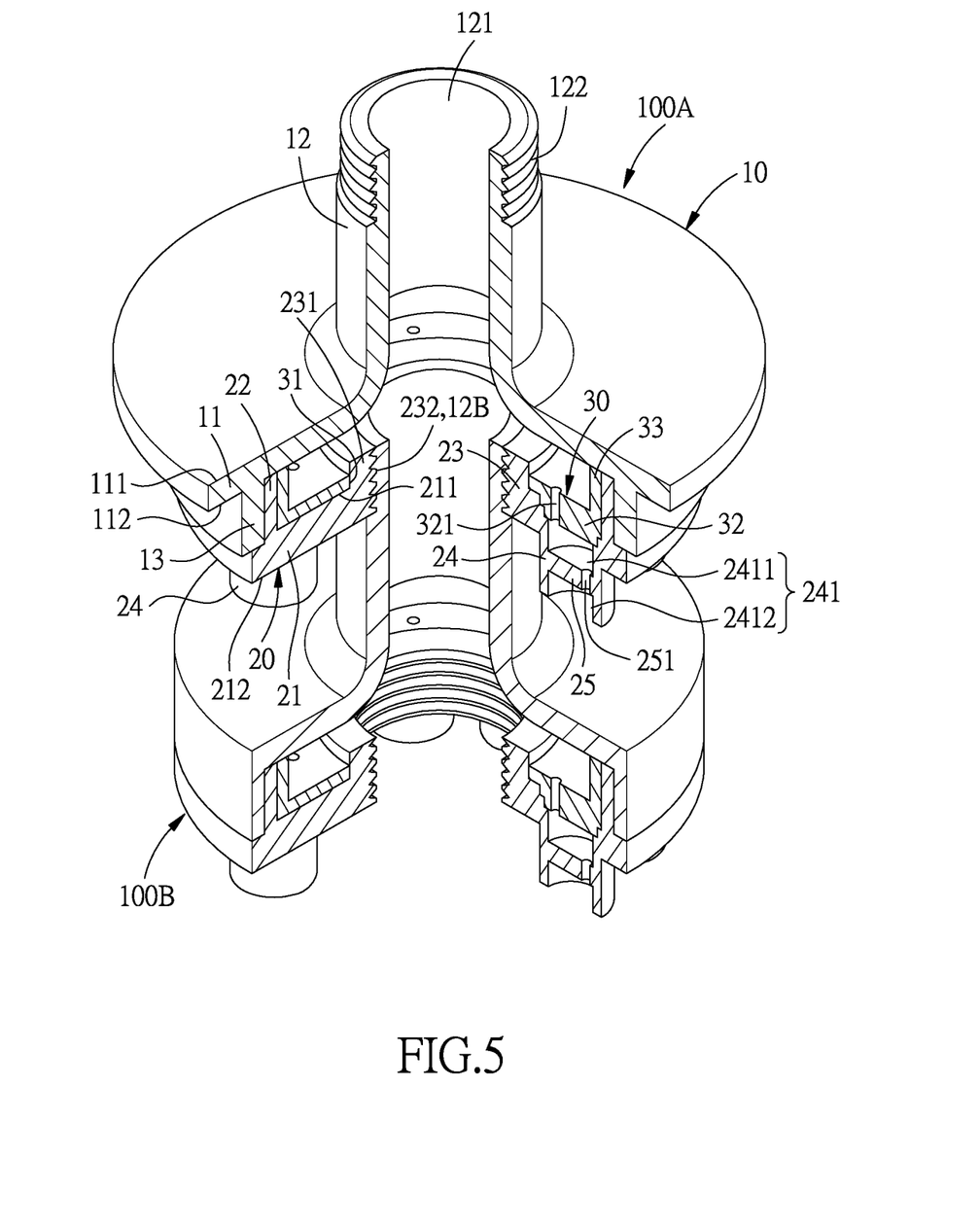
FIG. 5 is an assembly cross sectional view of the filter assembly for a fluid filter in accordance with the present invention.
Figure 6:
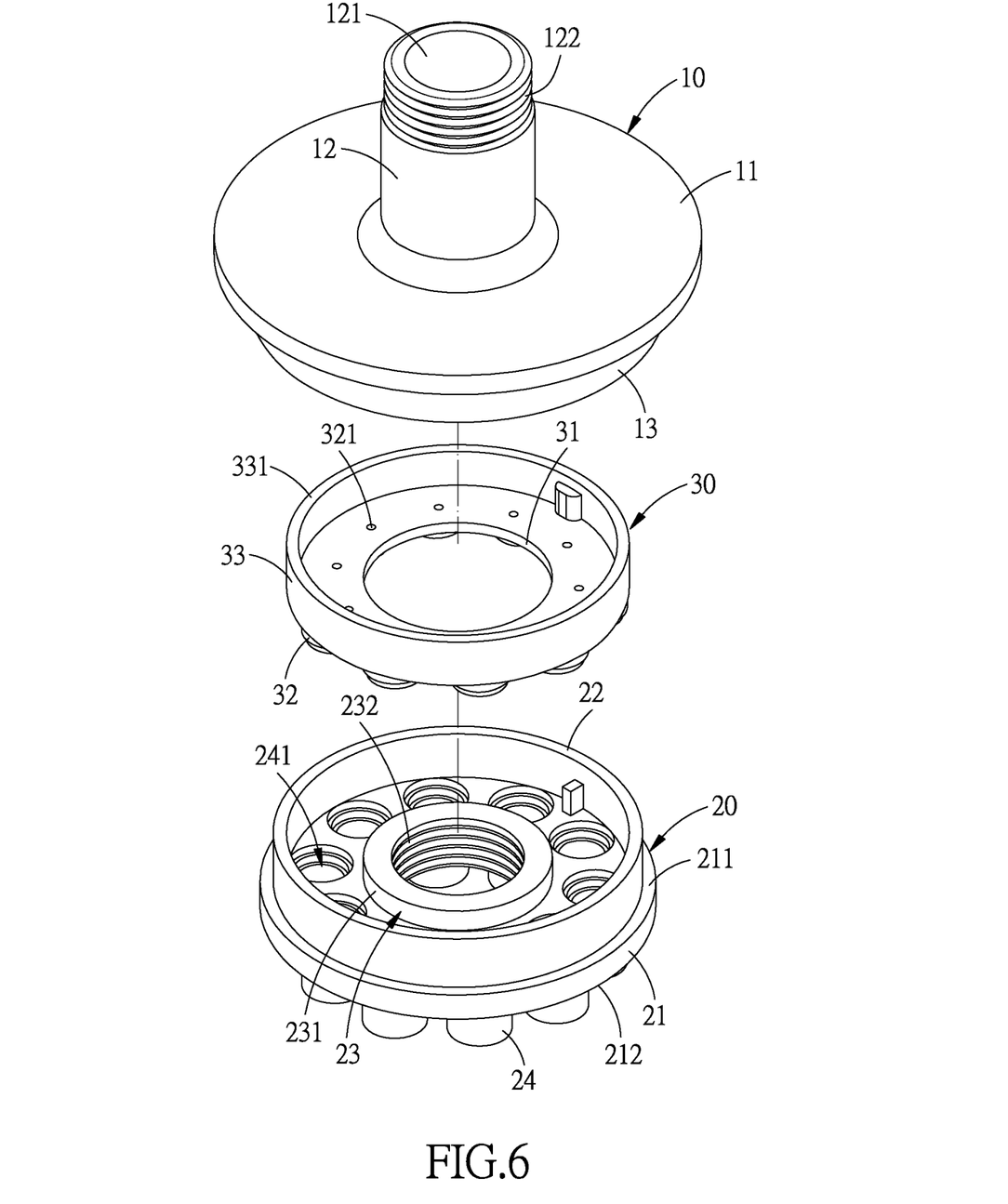
FIG. 6 is an exploded view of the filter assembly for a fluid filter in accordance with the present invention.
Figure 7:
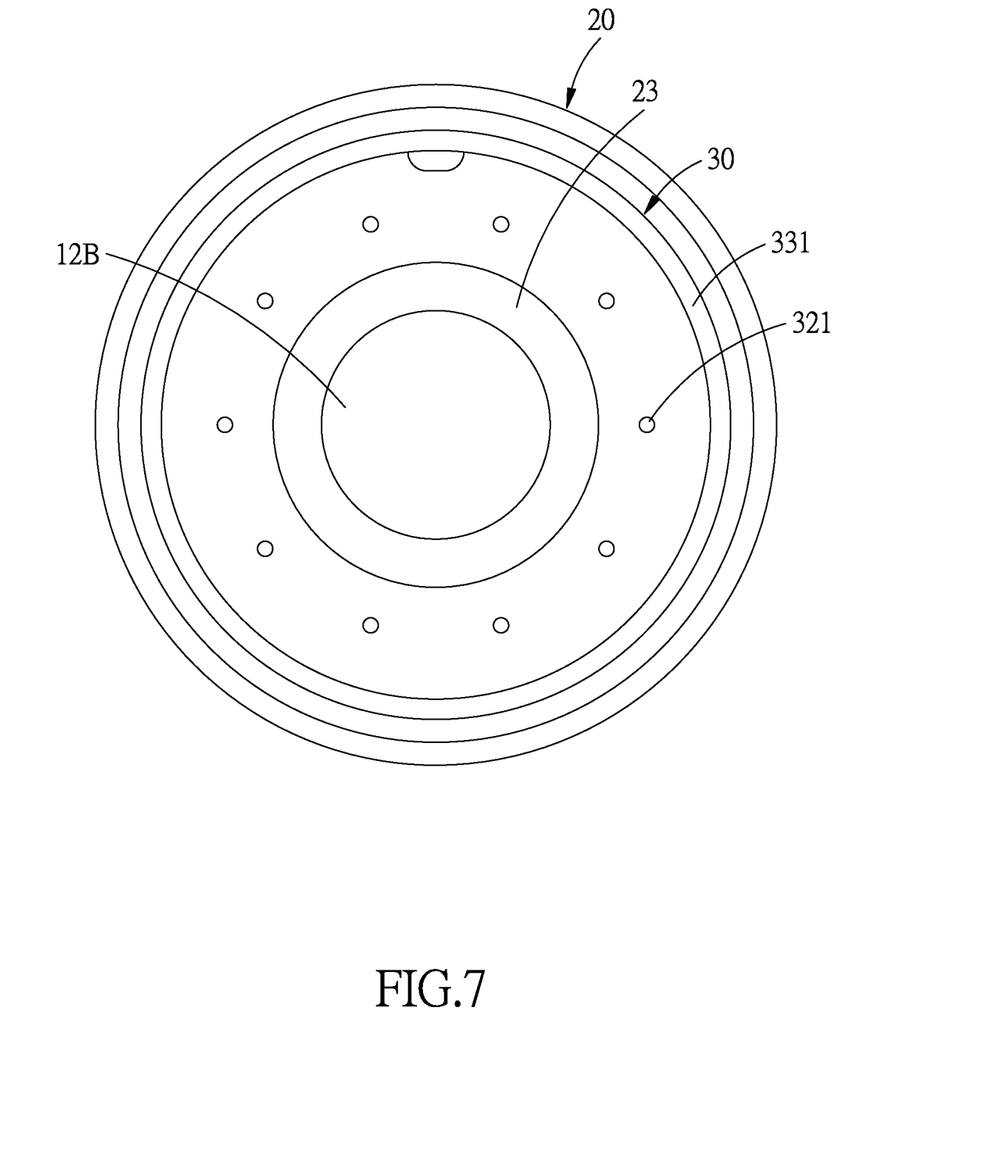
FIG. 7 is a top view of the filter assembly for a fluid filter in accordance with the present invention.

Referring to FIGS. 1-7, a filter assembly for a fluid filter in accordance with the present invention is disposed in a space defined by a filter cylinder 90 and a filter cover 91 and comprises three filter units which are identical structures assembled in series. The three filter units are a first filter unit 100A, a second filter unit 100B, and a third filter unit 100C. For easy explanation, only the first filter unit 100A is described as an example. The first filter unit 100A comprises: a connecting member 10, an input member 20 and an output member 30.

The connecting member 10 includes a connecting disc 11, a connecting pipe 12 which protrudes from a top surface 111 of the connecting disc 11 and is provided with a guiding passage 121 penetrating through the connecting disc 11, and an connecting ring 13 which protrudes from a bottom surface 112 of the connecting disc 11. In this embodiment, the connecting pipe 12 includes an outer thread 122.

The input member 20 includes an input plate 21, an input ring 22 which protrudes from a top surface 211 of the input plate 21 and fixed to the connecting ring 13, an extending pipe 23 which penetrates through the input plate 21 and is provided for insertion of a connecting pipe 12B of another filter unit (the second filter unit 100B for example), a plurality of input pipes 24 which protrude from a bottom surface 212 of the input plate 21 and are each provided with an input passage 241 penetrating through the input plate 21, and a separating portion 25 which is disposed in the input pipe 24 to divide the input passage 241 into an upper input chamber 2411 and a lower input chamber 2412. Each of the separating portions 25 includes an input hole 251 via which the upper and lower input chambers 2411, 2412 are in communication with each other. In this embodiment, the input ring 22 of the input member 20 is fixed on an inner surface of the connecting ring 13, and the extending pipe 23 includes an extending section 231 which protrudes from the top surface 211 of the input member 20, and also includes an inner thread 232.

The output plate 30 is fixed on the top surface 211 of the input plate 21, and comprises: an inserting hole 31 for insertion of the extending section 231 of the extending pipe 23, and a plurality of output protrusions 32 to seal the upper input chambers 2411. Each of the output protrusions 32 includes an output hole 321 in communication with the upper input chamber 2411. In this embodiment, the output plate 30 further comprises an output ring 33 which is fixed on an inner surface of the input ring 22 of the input member 20, and an airtightness is maintained between an end surface 331 of the output ring 33 and the bottom surface 112 of the connecting disc 11. Besides, each of the output holes 321 of the output plate 30 and a corresponding one of the input holes 251 of the input plate 21 are staggered at 180 degrees to each other.

It is to be noted that, in this embodiment, each of the filter units is disposed in the filter cylinder 90 and the filter cover 91. The connecting pipe 12 of the connecting member 10 of the first one (namely, the first filter unit 100A) of the filter units is disposed in the output pipe 911 of the filter cover 91, and an inner pipe 92 is sleeved onto the connecting ring 13 of the connecting member 10 of the first filter unit 100A. The connecting disc 11 of the connecting member 10 of the first filter unit 100A has a diameter 131 larger than an outer diameter 921 of the inner pipe 92 to improve filtering effect. There is an interval between the connecting disc 11 of the connecting member 10 and an inner surface 901 of the filter cylinder 90, and the smaller the interval, the better the filter effect. The extending pipe 23C of the input member 20C of the last one (namely the third filter unit 100C) of the filter units is sealed with a plug 96 which includes: a plug portion 961 which is inserted in the extending pipe 23C to produce a sealing effect, a cover portion 962 which covers the input pipes 24C of the input member 20C, and a recess 963 formed in the cover portion 962, so as to improve filter effect.

What mentioned above are the structural relations of the main components of the embodiment of the present invention, and the filter assembly for a fluid filter in accordance with the present invention processes the following advantages:

First of all, low assembling cost. Since the input member 20 of the respective filter units is provided with the extending pipe 23 which is used to connect the connecting pipe 12B of the connecting member 10B of another filter unit, via engagement of inner and outer threads for example in this embodiment. Therefore, the filter units can be easily assembled by directly screwing the connecting pipe 12B of the connecting member 10B of one filter unit into the extending pipe 23 of the input member 20 of another filter unit 100A, without using tools or fasteners. Hence, the assembling cost is relatively reduced.

On the other hand, low manufacturing cost. Since each of the filter units of the present invention consists of the connecting member 10, the input member 20 and the output plate 30, the manufacturing of the filter assembly of the present invention can be done with a single module, and the number of the filter units can be adjusted as desired, which reduces the manufacturing cost.

Finally, convenience of assembly: since the extending pipe 23 of the input member 20 includes the extending section 231 which protrudes from the top surface 211 of the input member 20, with the extending section 231, the extending pipe 23 of the input member 20 can be quickly guided into the inserting hole 31 of the output plate 30, so that the input and output plates 20, 30 can be assembled together conveniently.

While we have shown and described various embodiments in accordance with the present invention, it is clear to those skilled in the art that further embodiments may be made without departing from the scope of the present invention.

What is claimed is:
1. A filter assembly for a fluid filter comprising:
a plurality of filter units assembled in series, and each of the filter units comprising:
a connecting member including a connecting disc, a connecting pipe which protrudes from a top surface of the connecting disc and is provided with a guiding passage penetrating through the connecting disc, and an connecting ring which protrudes from a bottom surface of the connecting disc;
an input member including an input plate, an input ring which protrudes from a top surface of the input plate and fixed to the connecting ring, an extending pipe which penetrates through the input plate and is provided for insertion of a connecting pipe of another filter unit, a plurality of input pipes which protrude from a bottom surface of the input plate and are each provided with an input passage penetrating through the input plate, and a separating portion which is disposed in each of the input pipes to divide the input passage into an upper input chamber and a lower input chamber, each of the separating portions including an input hole in communication with the upper and lower input chambers; and an output member being fixed on the top surface of the input plate, and including an inserting hole for insertion of the extending pipe, and a plurality of output protrusions to seal the upper input chambers, and each of the output protrusions including an output hole in communication with a corresponding one of the upper input chambers.

2. The filter assembly for the fluid filter as claimed in claim 1, wherein the input ring is fixed on an inner surface of the connecting ring.

3. The filter assembly for the fluid filter as claimed in claim 1, wherein the extending pipe includes an extending section which protrudes from the top surface of the input plate and is inserted in the inserting hole of the output member.

4. The filter assembly for the fluid filter as claimed in claim 1, wherein the output member further comprises an output ring which is fixed on an inner surface of the input ring of the input member, and an airtightness is maintained between an end surface of the output ring and the bottom surface of the connecting disc.

5. The filter assembly for the fluid filter as claimed in claim 1, wherein each of the output holes of the output member and a corresponding one of the input holes of the input member are staggered at 180 degrees to each other.

6. The filter assembly for the fluid filter as claimed in claim 1, wherein the connecting pipe of the connecting member of a first one of the filter units is disposed in an output pipe of a filter cover.

7. The filter assembly for the fluid filter as claimed in claim 1, wherein the extending pipe of the input member of a last one of the filter units is sealed with a plug.

8. The filter assembly for the fluid filter as claimed in claim 7, wherein the plug includes a plug portion which is inserted in the extending pipe to produce a sealing effect, a cover portion which covers the input pipes of the input member, and a recess formed in the cover portion.

9. The filter assembly for the fluid filter as claimed in claim 1, wherein an inner pipe is sleeved onto the connecting ring of the connecting member of a first one of the filter units.

10. The filter assembly for the fluid filter as claimed in claim 9, wherein a connecting disc of a connecting member of the first one of the filter units has a diameter larger than an outer diameter of the inner pipe.

* * * * *